United States Patent [19]
Touchton et al.

[11] Patent Number: 6,043,748
[45] Date of Patent: Mar. 28, 2000

[54] SATELLITE RELAY COLLAR AND PROGRAMMABLE ELECTRONIC BOUNDARY SYSTEM FOR THE CONTAINMENT OF ANIMALS

[75] Inventors: Scott F. Touchton, Pottstown; Richard D. Mellinger, Radner; Donald L. Peinetti, Chester Springs, all of Pa.

[73] Assignee: Invisible Fence Company, Inc., Malvern, Pa.

[21] Appl. No.: 08/995,084

[22] Filed: Dec. 19, 1997

[51] Int. Cl.[7] ................................ G08B 23/00
[52] U.S. Cl. ................... 340/573.3; 340/573.4; 340/539; 340/825.49; 340/825.54; 119/721; 119/908
[58] Field of Search ............... 340/573.3, 573.1, 340/573.2, 573.4, 539, 825.49, 825.54; 119/721, 908, 720, 859; 342/357, 457

[56] References Cited

U.S. PATENT DOCUMENTS

| | | | |
|---|---|---|---|
| 5,461,365 | 10/1995 | Schlager et al. | 340/573 |
| 5,594,425 | 1/1997 | Ladner et al. | 340/825.06 |
| 5,650,770 | 7/1997 | Schlager et al. | 340/573 |
| 5,742,233 | 4/1998 | Hoffman et al. | 340/573 |
| 5,791,294 | 8/1998 | Manning | 119/721 |
| 5,868,100 | 2/1999 | Marsh | 119/421 |

OTHER PUBLICATIONS

Southam Business Communications, Inc., "Collaring the market for tracking animals award–winning company makes computerized devices to put on anything from mice to moose", Toronto Star, P. 5, Section F.

"Tracking Elephants: From the Ground and by Satellite", Elephant Satellite Tracking in Malaysia, Web Site www.si.edu/elephant/eletelem.htm.

*Primary Examiner*—Nina Tong
*Attorney, Agent, or Firm*—Dann, Doreman, Herrell and Skillman, P.C.

[57] ABSTRACT

A programmable boundary pet containment system is provided for controlling the access of animals to areas outside of programmed boundaries. A programmable relay collar is provided on an animal to transmit positional data as detected from positional satellites to a remotely located processing station. The processing station calculates the relayed data to determine the position of the animal relative to a configuration data file establishing confinement area boundaries. Animals that are detected as venturing beyond the programmed boundaries are subject to a correction stimulus, such as a mild shock or audible signal, delivered to the animal by the relay collar as enabled by the remotely located processing station.

28 Claims, 2 Drawing Sheets

SATELLITE RELAY COLLAR AND PROGRAMMABLE ELECTRONIC BOUNDARY SYSTEM FOR THE CONTAINMENT OF ANIMALS

FIELD OF THE INVENTION

This invention relates to animal and human tracking systems and, more specifically, to electronic animal tracking and containment systems. More particularly, the present invention relates to a programmable relay collar and remotely located processing station. The programmable collar is responsive to the signals of positional satellites such as G.P.S. (Global Positioning System) for the tracking and confinement of animals attempting to venture beyond the boundary of a programmably defined area.

BACKGROUND OF THE INVENTION

Electronic animal control systems are known in which a radio frequency receiver collar is attached to an animal to limit the movement of the animal to a predetermined area of confinement. The predetermined area is configured through the physical arrangement of a subterranean transmission antenna which transmits a unique electromagnetic signal produced by an operably linked transmitting device. The transmission pattern of the subterranean antenna creates zones of transmission or area "boundaries" in which the attached animal receiver collar is responsive to the uniquely transmitted electromagnetic signal. Upon entering a predetermined limit area, the receiver collar is adapted to detect the unique electromagnetic signal and, in response, deliver a correction stimulus, such as a mild shock or audible signal, to the animal. The effect of the repeated stimulus teaches the animal, such as a dog, to avoid the limit areas thus confining the animal without use of physical fences or barriers.

Underground pet containment systems have been largely successful in removing unsightly physical structures from the landscape. However, unlike physical barrier systems they are not easily reconfigured. The installation of a subterranean transmission antenna requires excavation of the boundary area. This excavation can be further complicated in areas having immovable objects such as trees or in geographical areas subject to extreme weather conditions, such as areas in which the earth is frozen for extended durations of time. Additionally, excavation entails the disruption of plant root systems, damaging surrounding crops, grass, flower beds, or trees. As such, present underground systems are generally permanent to the property in which they are originally installed. Homeowners who relocate are often forced to purchase a second system rather than excavating and salvaging an old system.

Similarly, homeowners and pets temporarily absent from their homes at alternate locations, such as vacation homes, are presently unable to utilize the benefits of the underground pet containment system installed at the primary site. Moreover, as animals mature or new animals are introduced to a predetermined confinement area it may be desirable to reconfigure the confinement area to adjust for the changing needs of the new or matured animal.

Accordingly, a low cost animal confinement/tracking system is provided for tracking the movement of an animal in which programmable boundaries may be utilized for the confinement of animals to a predefined area. The system is easily reconfigured and has the capability of being utilized in alternate locations.

SUMMARY OF THE INVENTION

A satellite tracking system for use with moving objects, such as animals and humans is provided for detecting the movement and location of a moving body relative to a positional satellite. In the preferred embodiment, a transponder, i.e. a receiver-transmitter, is carried by an animal for receiving and processing signals transmitted from the positional satellite. For this purpose, the transponder includes a satellite data receiver for detecting positional satellite data of a selected characteristic from the signal transmitted by the satellite and a transmitter responsive to the receiver for retransmitting selected positional satellite data. As an optional embodiment, the transponder may include a stimulus generator for generating a selected stimulus, such as an electrical shock or audible sound, to the animal. A remotely located processing station is responsive to the selected positional satellite data received from the transmitter of the responder. The processing station includes a location detector for determining the location of the animal in response to the received satellite positional data from the transmitter. In specific applications, an animal controller may be provided for transmitting a control signal back to the responder to enable the stimulus generator to deliver a control stimulus, such as an audible warning or an electrical shock, to the animal. In other embodiments, the processing station may include a location indicator to display or provide a specific location of the animal. The location indicator may include an alarm for indicating satellite failure and/or to provide an indication at the remotely located processing station of the movement of the animal to or beyond selected areas.

In a more specific embodiment, an electronic animal tracking/control system employing a programmable relay unit, such as a transponder collar, responsive to a positional satellite is provided for use with animals requiring confinement to a limited area. Specifically, a programmable relay collar is provided for the reception of satellite signals such as G.P.S. NAVSTAR system transmissions. The collar is secured to an animal subject to confinement and relays positional data to a remotely located processing station. The collar may be in the form of a neck collar or other type of harness, strap, or connecting device for securing the unit to an animal.

The programmable relay collar includes a receiver/transmitter which may be programmed to define an area of confinement relative to the positional signals from a satellite or a group of satellites. The programmable collar configures a set of confinement boundaries that may be input or changed by a user when in a program mode. The program mode enables the programmable relay collar to relate specific geographical coordinates or boundaries to detected positional satellite signals. Thus, desired confinement boundaries may be configured or altered by a user. For example, the collar may be programmed by placing a programmable relay collar in program mode and physically transporting or "walking off" the collar along desired boundaries. As the relay collar travels the desired boundaries in program mode, the collar transmits the relative values of the positional satellite signals encountered at these boundaries to a remotely located processing station for storage in a volatile or non-volatile memory device.

The remotely located processing station stores the configuration data transmitted by the programmable relay collar for processing in a configuration data file. Once a desired configuration is entered, the collar is placed in relay mode and attached to an animal requiring confinement in the area defined by the configuration data file. While in relay mode, the collar continuously relays, via RF transmissions, positional data as detected from positional satellites. The rate of relay is variable to conserve collar battery life, determined by the animals calculated ground speed and location relative to the configuration data file boundaries. If such data as processed by the remotely located processing station indicates that the animal is seeking to move into the vicinity of a configuration limit, a stimulus enable is broadcast from the remotely located processing station to the relay collar. The stimulus enable signal activates the relay collar to provide a correction stimulus, such as a mild shock or audible signal, to the animal. Where positional data indicates that the animal is moving at a rate which is incompatible with the animals physical ability as determined by the processing station, a stimulus enable is not transmitted. In an alternate embodiment, the relay collar may be configured for on-board operation to process the satellite signal itself to determine the location of the animal. In this configuration, the satellite signal is not relayed to a remote processing station. Instead, the signal is processed in a collar processor to detect and track movement of the animal. A stimulus generator on the collar may respond to the detection of movement of animal beyond the selected confined area to provide a selected stimulus to the animal.

The remotely located processing station includes a microprocessor or microcontroller for the processing of positional satellite data required to determine the location of an animal relative to the satellite signals. Additionally, the remotely located processing station includes a data storage device for the storage of configuration files and tracking software and a receiver/transmitter for communication with the relay collar.

In a particular embodiment, the remotely located processing section is a personal computer having a communication port adapted to communicate between the personal computer and the relay collar. Management and communication software compatible with known operating environments such as the Windows operating interface is provided for use with the personal computer. The software enables the visual display of configuration data file coordinates and the animal's location relative thereto. The personal computer includes a modem for connection to a satellite monitoring computer which monitors the status of positional satellites. Upon relay of a positional satellite signal to the personal computer which is not logically related to the prior transmission, or where no signal is available, the personal computer contacts the satellite monitoring computer to determine the status of the satellites. If the minimum number of satellites are not available for tracking, the satellite monitoring computer disables the stimulus enable signal of the personal computer and activates an alarm located at the remotely located processing station to indicate the failure of the system.

Configuration data files may be transported via floppy disk, cd rom, etc. Additional computer systems utilizing the software and appropriately configured communication ports and communication devices enable portability of the satellite relay collar and programmable electronic boundary system for the containment of animals.

BRIEF DESCRIPTION OF THE DRAWINGS

The foregoing summary, as well as the following detailed description of the preferred embodiments of the present invention, will be better understood when read in conjunction with the accompanying drawings in which.

DETAILED DESCRIPTION OF THE PREFERRED EMBODIMENTS

Figure 1:
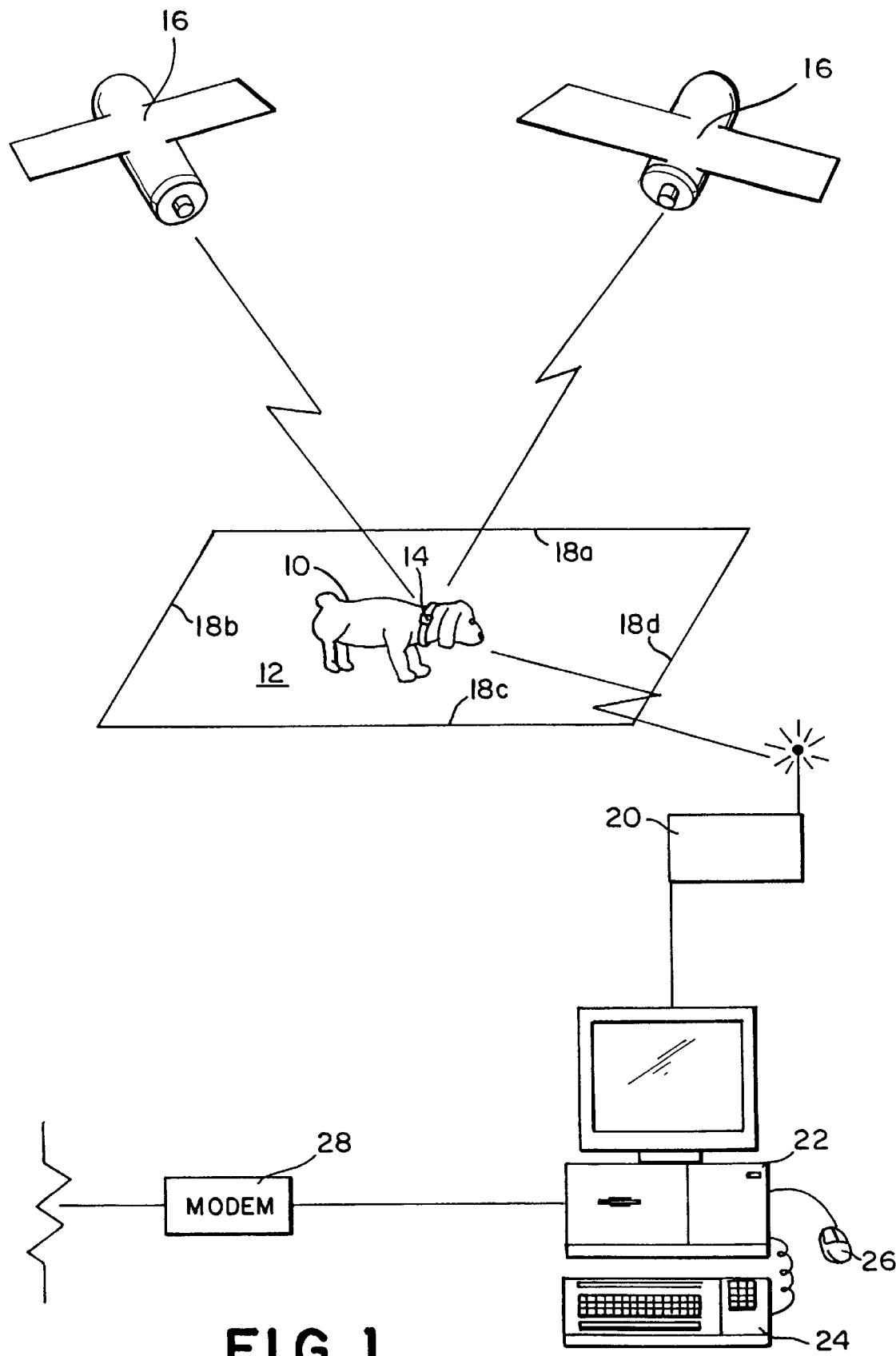
FIG. 1 is a schematic diagram of the programmable electronic boundary system.

A programmable boundary electronic control system, generally designated 5, is provided for the tracking the movement of animals, humans and like moving objects. Specifically, a programmable relay collar 14 emits, at a variable or preset rate, RF transmissions of positional data as detected from signals of positional satellites 16 to a remotely located processing station 22. The processing station 22 calculates the relayed data to determine the position and ground speed of an object 10 relative to a configuration data file establishing confinement area boundaries. Objects detected as venturing beyond the programmed boundaries are subject to a correction stimulus, such as a mild shock or audible signal, delivered to the object by the relay collar 14 when enabled by the RF transmissions of the remotely located processing station.

Referring now to FIG. 1, a programmable electronic tracking system 5 is provided for tracking the movement of an animal, such as a dog, relative to a selected confinement area 12. In broad application, the system may be used to track the movement and location of an animal anywhere relative to the positional data from the satellites. As such, both positional location and directional speed of movement can be detected and tracked. As shown in FIG. 1, the group of positional satellites 16 such as the G.P.S. system (Global Positioning System), a programmable collar 14 carried by the animal, and a remotely located data processing station 22 having an operably linked communication device 20 are depicted. In the preferred embodiment, the processing station 22 is operably linked with a modem 28 for communication with a satellite monitoring computer capable of dynamically disabling the stimulus enable of processing station 22 and activating an alarm of the processing station 22 to indicate a satellite system failure. The alarm of the processing station 22 is either audible or visual and may be performed by an appropriately interfaced home automation system.

SYSTEM OPERATION

As shown in FIG. 1, a set of programmed boundaries 18a–d enclose an area 12, such as a yard, occupied by an animal such as dog 10. The dog 10 is equipped with a programmable relay collar 14 which includes detection circuitry and transmission circuitry, preferably battery operated. The reception circuitry detects signals from positional satellites, generally designated 16, as well as update and stimulus signals from the remotely located processing station 22. The transmission circuitry relays positional satellite data to the remotely located processing station 22.

Positional satellites 16 radiate precise positional information to relay collar 14. If the distance between a relay collar 14 relative to three positional satellites 16 is known the collar 14 can be located on the surface of the earth utilizing the three dimensional Pythagorean theorem. The distance from the collar 16 to the positional satellites 16 is determined by calculating the time between a satellite signal broadcast and collar reception. Each positional satellite signal includes a unique (PN) Pseudonoise sequence so that the receiver can differentiate between various satellites and account for their specific orbital movement.

This positional information is relayed at a variable rate or preset rate by collar 14 at a selected radio frequency to the remotely located processing station 22. The frequency of the signal transmitted by the relay collar to the processing station is lower than the frequency of the signal received by the collar from the satellite. The remotely located processing station 22 determines the location and ground speed of the animal equipped with relay collar 14 relative to the programmed confinement area boundaries.

Figure 2:
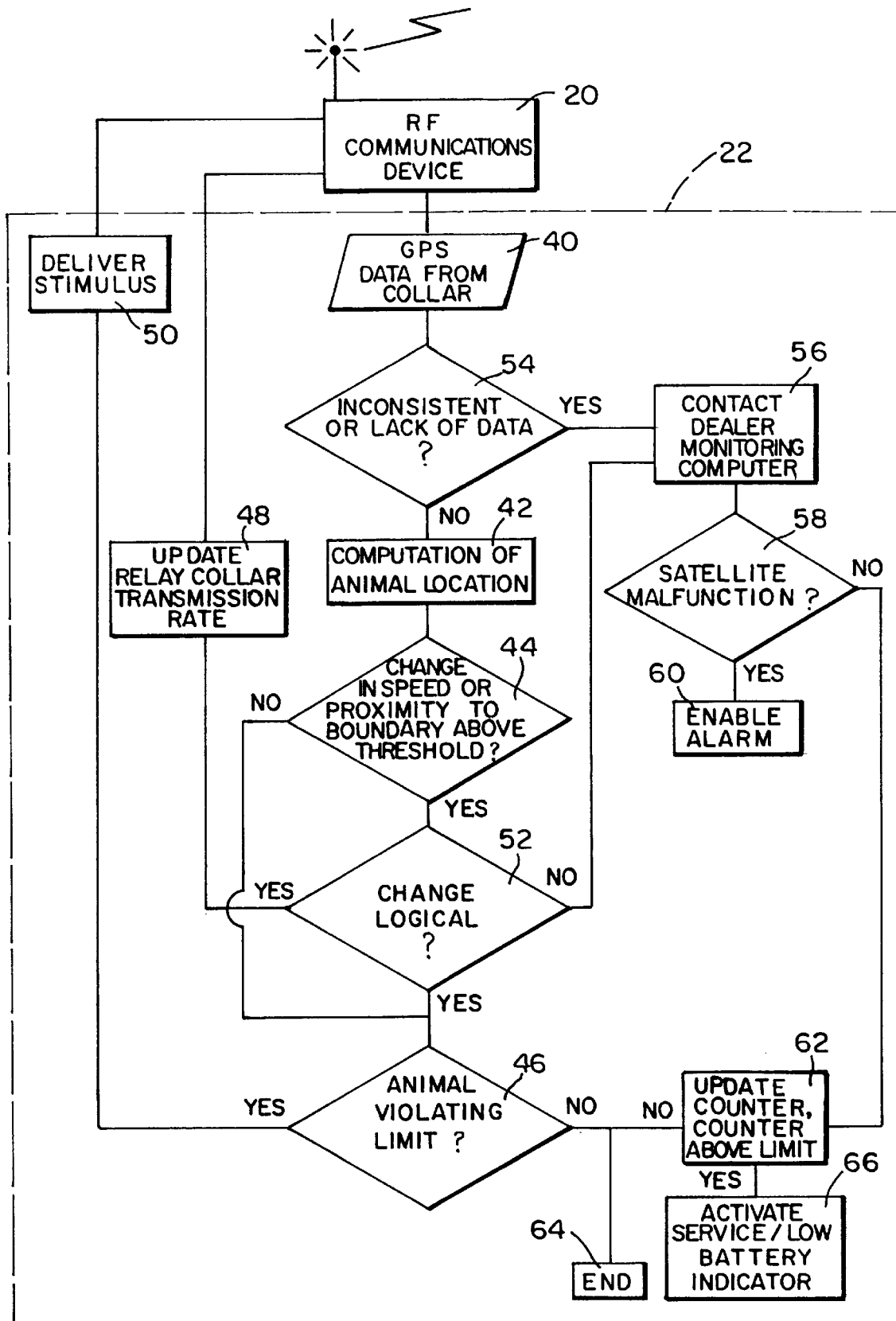
FIG. 2 is a flow chart of the data processing function of the electronic boundary system of FIG. 1.

The collar 14 attached to animal 10 is placed in RELAY MODE to monitor the whereabouts of the animal relative to a configuration data file stored in the memory of the remotely located data processing station 22. Referring now to FIG. 2, while in relay mode, the collar periodically relays positional satellite data at a variable rate or preset rate, via RF transmissions, as detected from positional satellites 16 to the processing station 22 as shown in step 40. The rate of transmission of the relay information is either preset or determined by the speed of the animal as calculated by the remotely located processing station 22. In the case of a preset rate steps 44 and 48 of FIG. 2 are bypassed.

In the preferred embodiment, as an animal approaches within a preset distance of a programmed boundary, such as twenty to thirty feet, the relay rate may adjust accordingly, increasing for example from one sample per second to upward of ten samples per second. The adjust enable is activated by the processing station 22 through an adjust enable signal 48 as identified by step 44 and determined logical by step 52. The location of an object is determined to be logical if it is possible based on the previous location, objects calculated as suddenly displaced by large distances above a programmed threshold are ignored. Repeated detection of illogical object displacement, at step 54, which is not caused by a satellite malfunction, as determined at step 58, are counted up to a defined user selectable threshold at step 62. Exceeding the user selectable threshold causes, at step 66, activation of an audible or visual indication at the processing station 22 informing the operator to have the system serviced. This may entail the changing of the battery of relay collar 14.

Similarly, if an increase in animal speed is detected at step 44 and determined to be within the ability of the object at step 52, the relay collar 14 receives a transmission rate adjust enable signal at step 48 from the remotely located processing station 22 to ensure accuracy of the animal location determination by increasing the rate of relay. The speed of an object is determined to be logical if it is within the objects capability of movement which is defined as being below a programmed threshold. Alternatively, if the animal is dormant or if a decrease in velocity is detected, the relay collar 14 receives a transmission rate adjustment enable signal at step 48 from the processing station 22 to conserve relay collar battery power by decreasing the rate of relay. The rate of change in speed or proximity to a programmed boundary which triggers an adjust enables signal is a user defined parameter adjusted through the utilization of the management and communication software of the data processing station 22. Additionally, the number of repeated illogical signals counted in step 62 is a user defined parameter adjusted through the utilization of the management and communication software of the data processing station 22.

If such data as processed by the remotely located processing station indicates that the animal is seeking to breach a configuration boundary step 46, a stimulus enable signal step 50 is broadcast from the remotely located processing station 22 to the relay collar 14. The stimulus enable signal activates the relay collar to provide a correction stimulus, such as a mild shock or audible signal, to the animal. An alarm or indication at the processing station 22 may be activated to alert a user in the vicinity of the processing station of a breach or potential breach of the confinement area.

In an alternative embodiment, the level of stimulus enabled by processing station 22 is variable, corresponding to a particular collared animal or the proximity of a collared animal to a programmed boundary 18*a–d*. For example, groups of animals subject to the programmable electronic boundary system are equipped with independently addressable relay collars 14 such that a unique level of stimulus can be communicated to individual animals 10 through data processing station 22. In this way, the stimulus enabled by the data processing station 22 is programmable so as to conform with the physical characteristics of the animal (i.e. size, weight, etc). Similarly, the level of stimulus enabled by processing station 22 may further correspond to a collared animal's proximity to a programmed boundary 18*a–d*. Thus, an animal 10 that is closer to a boundary than a second animal may be subject to a greater degree of stimulus as enabled by processing station 22. The unique levels of stimulus for separate animals having independently addressable collars 14, as well as variable boundary proximity stimulus, are input at the data processing station 22 and saved in the data configuration file.

PROGRAMMING OF BOUNDARIES

The programmable collar configures a set of confinement boundaries when operating in a program mode. The program mode enables the programmable relay collar to relate specific geographical coordinates or boundaries to detected positional satellite signals.

The programmable relay collar 14 includes a receiver/transmitter. When the collar 14 is placed in PROGRAM MODE the transmitter is enabled to define an area of confinement relative to the positional signals of a group of satellites. In PROGRAM MODE the collar 14 is physically transported along a desired confinement boundary. The satellite parameters unique to the boundary coordinates are transmitted by the collar 14 to the remotely located processing station 22 for storage. The programmable collar defines the area of confinement by transmitting a data set of satellite parameters to the remotely located processing station 22.

The remotely located processing station 22 stores the data set in a volatile or non-volatile memory. Thus, a plurality of configuration files each defining a unique boundary y may be created and stored for use with different sized animals or different confinement locations. In a preferred embodiment data configuration files are stored on volatile memory mediums such as floppy disks, cd-roms, etc. for use with the collar 14 at alternate locations equipped with processing stations 22.

DATA PROCESSING

The remotely located processing station 22 stores the configuration data transmitted in PROGRAM MODE by the programmable relay collar 14 for storage in a configuration data file.

The remotely located processing station 22 is preferably a general purpose computer, such as a personal computer, including a microprocessor for the processing of positional satellite data required to determine the location of an animal 14 relative to the signals of positional satellites 16. Additionally, the remotely located processing station 22 includes a data storage device for the storage of configuration files and for tracking software and a communication device 22 for communication with the relay collar 14.

In a preferred embodiment, the remotely located processing section 22 is a personal computer having a communication port adapted to communicate between the personal computer and relay collar through communication device 22, and a modem 28 for the of integration system functions with an existing home automation system. Additionally, the personal computer 22 includes a modem 28 for connection to a satellite monitoring computer 29 which monitors the status of positional satellites. Upon relay of a positional satellite signal to the personal computer which is not logically related to the prior transmission, or where no signal is available, the personal computer 22 contacts the satellite monitoring computer 29 to determine the status of the satellites. If the minimum number of satellites are not available for tracking, the satellite monitoring computer 29 disables the stimulus enable signal of the personal computer 22 and activates an alarm located at the personal computer 22 to indicate the failure of the system.

Management and communication software compatible with known operating environments such as the Windows operating interface is provided for use with the personal computer. The software enables the visual display of configuration data file coordinates and the animal's location relative thereto. Configuration data files can be adjusted and edited utilizing the software of data processing station 22 to expand, contract or completely reconfigure the boundaries or otherwise alter the parameters of the configuration data file.

The memory device of processing station 22 may include volatile and non-volatile forms of computer memory. Preferably, data configuration files are stored in a non-volatile mass storage device such as a hard disk drive. Copies of data configuration files may be transported via portable memory mediums such as floppy disks, cd roms, DAT's, etc. The portability of such files and relay collars enables use of system configurations and capabilities by additional computer systems utilizing the software and communication device of the programmable boundary electronic containment system.

In an alternative embodiment the functions of the remotely located data processing station are performed by the relay collar eliminating the need for communication device 20 and processing station 22. In this embodiment the relay collar performs all calculations. The data processing station 22 may be utilized to reconfigure or back-up configuration data files stored within the relay collar 14 through an optional serial or parallel port communications port of relay collar 14. In this embodiment the collar would transmit an alarm enable for audible or visual indication of a collar or satellite system failure.

The terms and expressions which have been employed are used as terms of description and not of limitation. There is no intention in the use of such terms and expressions of excluding any equivalents of the features shown and described or portions thereof. It is recognized, however, that various modifications are possible within the scope of the invention as claimed. For example, data processing station 22 may have been described in terms of a single dedicated specifically programmed hardware module utilized solely for pet containment purposes.

Additionally, while the present technique has been described in connection with animal control and tracking, the principles of the invention are generally applicable to the tracking and delivery of control communications to humans.

That which is claimed is:

1. An animal containment system for detecting the location of an animal relative to a positional satellite, the system comprising:

(a) a transponder carried by the animal having a satellite data receiver for detecting positional satellite data of a selected characteristic, a transmitter responsive to said receiver for re-transmitting selected positional satellite data and a stimulus generator for generating a selected stimulus to the animal; and (b) a control station responsive to the selected positional satellite data from the transmitter including an animal speed monitor for updating retransmission rate of the transmitter relative to the change in location by the animal, and an animal controller for providing a control signal to the transponder to deliver the stimulus to the animal.

2. A method for detecting the location of an animal relative to a positional satellite, comprising the steps of:

a. detecting positional satellite data of a selected characteristic using a transponder carried by the animal having a satellite data receiver, b. retransmitting selected positional satellite data using a transmitter responsive to said receiver, c. generating a selected stimulus to the animal using a stimulus generator; and d. determining the change in location of the animal in response to the selected satellite positional data from the transmitter and an animal speed monitor for updating the retransmission rate of the transmitter relative to the change in location by the animal, and an animal controller for providing a control signal to the transponder to deliver the stimulus to the animal.

3. An animal containment system for detecting the location of an animal relative to a positional satellite, the system comprising:

(a) a transponder carried by the animal having a satellite data receiver for detecting positional satellite data of a selected characteristic, a transmitter responsive to said receiver for retransmitting selected positional satellite data and a stimulus generator for generating a selected stimulus to the animal; and (b) a control station responsive to the selected positional satellite data from the transmitter including a location detector for determining the change in location of the animal in response to the selected satellite positional data from the transmitter and animal speed monitor for updating the retransmission rate of the transmitter relative to the change in location by the animal, and an animal controller for providing a control signal to the transponder to deliver the stimulus to the animal.

4. The system according to claim 3, wherein the transponder includes a stimulus generator for generating an electrical shock or an audible sound that is delivered to the animal.

5. The system according to claim 3, wherein the control station transmits a control signal back to the transponder to enable the stimulus generator to deliver an audible warning or an electrical shock to the animal.

6. The system according to claim 3, wherein the processing station includes a location indicator to display a specific location of the animal.

7. The system according to claim 6, wherein the location indicator includes an alarm for indicating satellite failure or to provide an indication at the remotely located processing station of the movement of the animal is beyond a selected area.

8. The system according to claim 3, wherein the control station includes an electronic animal tracking control system having a programmable relay unit.

9. The system according to claim 8, wherein the programmable relay unit is a transponder collar that is responsive to a positional satellite.

10. The system according to claim 9, wherein the collar relays positional data to a remotely located processing station.

11. The system according to claim 3, wherein the collar is provided for the reception of satellite signals such as G.P.S. NAVSTAR system transmissions.

12. The system according to claim 3, wherein the transponder configures a set of confinement boundaries that may be input or changed by a user when in a program mode.

13. The system according to claim 3, wherein the transponder relates specific geographical coordinates or boundaries to detected positional satellite signals.

14. The system according to claim 3, wherein the control station or a user configures a confinement boundary.

15. The system according to claim 3, wherein the transponder includes a program mode that transmits relative values of the positional satellite signals when physically transporting the transponder along a boundary.

16. The system according to claim 15, comprising a remotely located processing station for storing the transmitted relative values of the positional satellite.

17. The system according to claim 3, wherein the control station is remotely located from the transponder.

18. The system according to claim 3, wherein the control station stores boundary configuration data transmitted by the transponder.

19. The system according to claim 18, wherein the configuration data is stored in a configuration data file.

20. The system according to claim 3, wherein the transponder stores data defining a confinement boundary.

21. The system according to claim 3, wherein the transponder includes a relay mode that continuously relays positional data as detected from positional satellites.

22. The system according to claim 21, wherein the transponder includes power conserving circuitry that controls the rate of relay to conserve transponder battery life.

23. The system according to claim 3, wherein the control station determines that the animal is moving toward a predetermined confinement boundary.

24. The system according to claim 23, wherein the control station transmits a stimulus enable signal activating the transponder to generate a correction stimulus.

25. The system according to claim 24, wherein the correction stimulus is a shock or audible signal.

26. The system according to claim 3, wherein the control station determines that the animal is moving at a rate that is incompatible with a preselected animal's physical ability.

27. The system according to claim 3, wherein the control station tracks the movement of the animal.

28. The system according to claim 3, wherein the control station communicates with a personal computer for producing a visual display of a containment boundary and the animal's location from the selected positional data.

* * * * *